US011601513B2

(12) United States Patent
Maslak et al.

(10) Patent No.: US 11,601,513 B2
(45) Date of Patent: *Mar. 7, 2023

(54) CONTENT DELIVERY SYSTEMS AND METHODS

(71) Applicant: Level 3 Communications, LLC, Broomfield, CO (US)

(72) Inventors: Joelle T. Maslak, Golden, CO (US); Joseph C. Lawrence, Boulder, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 78 days.

This patent is subject to a terminal disclaimer.

(21) Appl. No.: 16/659,014

(22) Filed: Oct. 21, 2019

(65) Prior Publication Data

US 2020/0053172 A1     Feb. 13, 2020

Related U.S. Application Data

(63) Continuation of application No. 14/924,121, filed on Oct. 27, 2015, now Pat. No. 10,455,030.

(60) Provisional application No. 62/069,061, filed on Oct. 27, 2014.

(51) Int. Cl.
*H04L 67/52*     (2022.01)
*H04L 61/4511*     (2022.01)
*H04L 101/69*     (2022.01)

(52) U.S. Cl.
CPC .......... *H04L 67/52* (2022.05); *H04L 61/4511* (2022.05); *H04L 2101/69* (2022.05)

(58) Field of Classification Search
CPC ..... H04L 67/18; H04L 61/1511; H04L 61/609
See application file for complete search history.

(56) References Cited

U.S. PATENT DOCUMENTS

| 2008/0279222 | A1 | 11/2008 | Fuller et al. |
| 2010/0121945 | A1 | 5/2010 | Gerber |
| 2010/0153802 | A1* | 6/2010 | Van der Merwe .......... H04L 12/1868 714/748 |
| 2011/0040861 | A1* | 2/2011 | Van der Merwe .......... H04L 61/4511 709/245 |

(Continued)

OTHER PUBLICATIONS

Chinese Examination Report, dated Sep. 28, 2020, Application No. 201580076890.7, filed Dec. 31, 2015; 3 pgs.

(Continued)

*Primary Examiner* — Chris Parry
*Assistant Examiner* — Steven C Nguyen

(57) ABSTRACT

Aspects of the present disclosure involve a CDN utilizing a Direct Server Return (DSR) request command to create a tunnel from one content server to another content server of the CDN. Through the DSR tunnel, a request for content may be served from a content server that is more advantageous for the CDN for any number of reasons, such as from a content server that is logically closer to the content server. In determining when a DSR tunnel is created to provide the content, the CDN may access a database storing various information concerning the CDN, such as the location of egress gateways of the CDN in relation to one or more content servers, connecting network location information, the capabilities of one or more content servers, and/or load information of available content servers.

17 Claims, 6 Drawing Sheets

(56) References Cited

U.S. PATENT DOCUMENTS

| | | | | |
|---|---|---|---|---|
| 2012/0096128 | A1* | 4/2012 | Maloo | H04L 61/4511 |
| | | | | 709/219 |
| 2014/0108674 | A1* | 4/2014 | Eggleston | H04L 67/2814 |
| | | | | 709/245 |
| 2014/0149601 | A1* | 5/2014 | Carney | H04L 63/10 |
| | | | | 709/238 |
| 2014/0280803 | A1* | 9/2014 | Kazerani | H04L 67/1036 |
| | | | | 709/221 |
| 2015/0029869 | A1* | 1/2015 | Wolcott | H04L 43/50 |
| | | | | 370/242 |
| 2015/0215388 | A1 | 7/2015 | Kontothanassis | |
| 2015/0264009 | A1* | 9/2015 | Scharber | H04L 49/901 |
| | | | | 709/203 |
| 2015/0358401 | A1* | 12/2015 | Flavel | H04L 67/1008 |
| | | | | 370/235 |
| 2016/0119279 | A1 | 4/2016 | Maslak et al. | |

OTHER PUBLICATIONS

European Examination Report, dated Feb. 12, 2020, Application No. 15854200.1, filed Oct. 27, 2015; 4 pgs.

Extended European Search Report, dated May 23, 2018, Application No. 15854200.1, filed Oct. 27, 2015; 9 pgs.

International Preliminary Report on Patentability dated May 2, 2017, Int'l Appl. No. PCT/US15/057568, Int'l Filing Date Oct. 27, 2015; 6 pgs.

International Search Report dated Jan. 21, 2016, Int'l Appl. No. PCT/US15/057568, Int'l Filing Date Oct. 27, 2015; 3 pgs.

Written Opinion of the International Searching Authority dated Jan. 21, 2016, Int'l Appl. No. PCT/US15/057568, Int'l Filing Date Oct. 27, 2015; 4 pgs.

Canadian Examination Report, dated Dec. 21, 2020, Application No. 2,965,852, filed Oct. 27, 2015; 2 pgs.

* cited by examiner

CONTENT DELIVERY SYSTEMS AND METHODS

RELATED APPLICATIONS

This application claims priority under 35 U.S.C. § 119 to U.S. Provisional Application No. 62/069,061 entitled "CONTENT DELIVERY SYSTEMS AND METHODS", filed on Oct. 27, 2014, which is incorporated by reference in its entirety herein.

TECHNICAL FIELD

Aspects of the present disclosure relate generally to serving content from a content delivery network, and more particularly to determining from which server to serve a content request and may involve content delivery network anycast localization.

BACKGROUND

The Internet and the World Wide Web (the "Web") are ubiquitous and easily accessible using numerous possible devices. Content providers (publishers) now use the Internet (and, particularly, the Web) to provide all sorts of content to numerous users throughout the world. In order to offload the job of serving some or all of its content, many content providers now operate or subscribe to content delivery networks (CDNs). Using a CDN, content can be served to clients from the CDN (e.g., from one or more content servers in the CDN) instead of from the content provider's server(s). In a caching CDN, content may also be cached on some or all of the CDN servers, either before being served or in response to specific requests for that content. Having content cached enhances the performance of the CDN because the content does not have to be retrieved from origin servers or other locations, which are less efficient than edge servers in providing content.

Numerous forms of content may be served from the CDN. For example, television shows and movies may now be accessed from any number of Web sites, and the shows and movies may be served from the CDN. Print newspapers have migrated to the Web and provide portals through which clients operating some form of computing device (e.g., PC, smart phone, or tablet), with a browser may access numerous forms of content, such as short video clips, articles, images, and audio tracks. Software updates and patches, once provided on disc and mailed to recipients, are now routinely distributed to devices from a CDN through one or more network connections and devices.

It is with these observations in mind, among others, that various aspects of the present disclosure were conceived and developed.

SUMMARY

One implementation of the present disclosure may take the form of a method for servicing a request for content. The method includes the operations of receiving a request to resolve a content request to obtain a network address for content from a content delivery network, obtaining access network configuration information from a database, the access network configuration information comprising an estimated geographic location of an end user device in communication with the access network in relation to a geographic location of a resolver of the access network, and returning an anycast address for the content request based at least on the estimated geographic location of the end user device in communication with the access network in relation to the resolver of the access network, the estimated geographic location of the end user device different than the geographic location of a resolver of the access network.

Another implementation of the present disclosure may take the form of a system for delivering requested content to a device. The system includes domain name server (DNS) receiving a request to resolve a content request to obtain a network address for content from a content delivery network, a database storing access network configuration information comprising an estimated geographic location of an end user device in communication with the access network in relation to a geographic location of a resolver of the access network, and a computing device in communication with the file database. The computing device comprises at least one processor, at least one communication port for communication with the database, and a tangible computer-readable medium with one or more executable instructions stored thereon. When the at least one processor executes the one or more instructions, the processor performs the operations of obtaining the access network configuration information from the database and instructing the DNS to return an anycast address for the content request based at least on the estimated geographic location of the end user device in communication with the access network in relation to the resolver of the access network, the estimated geographic location of the end user device different than the geographic location of a resolver of the access network.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

DETAILED DESCRIPTION

Figure 1:
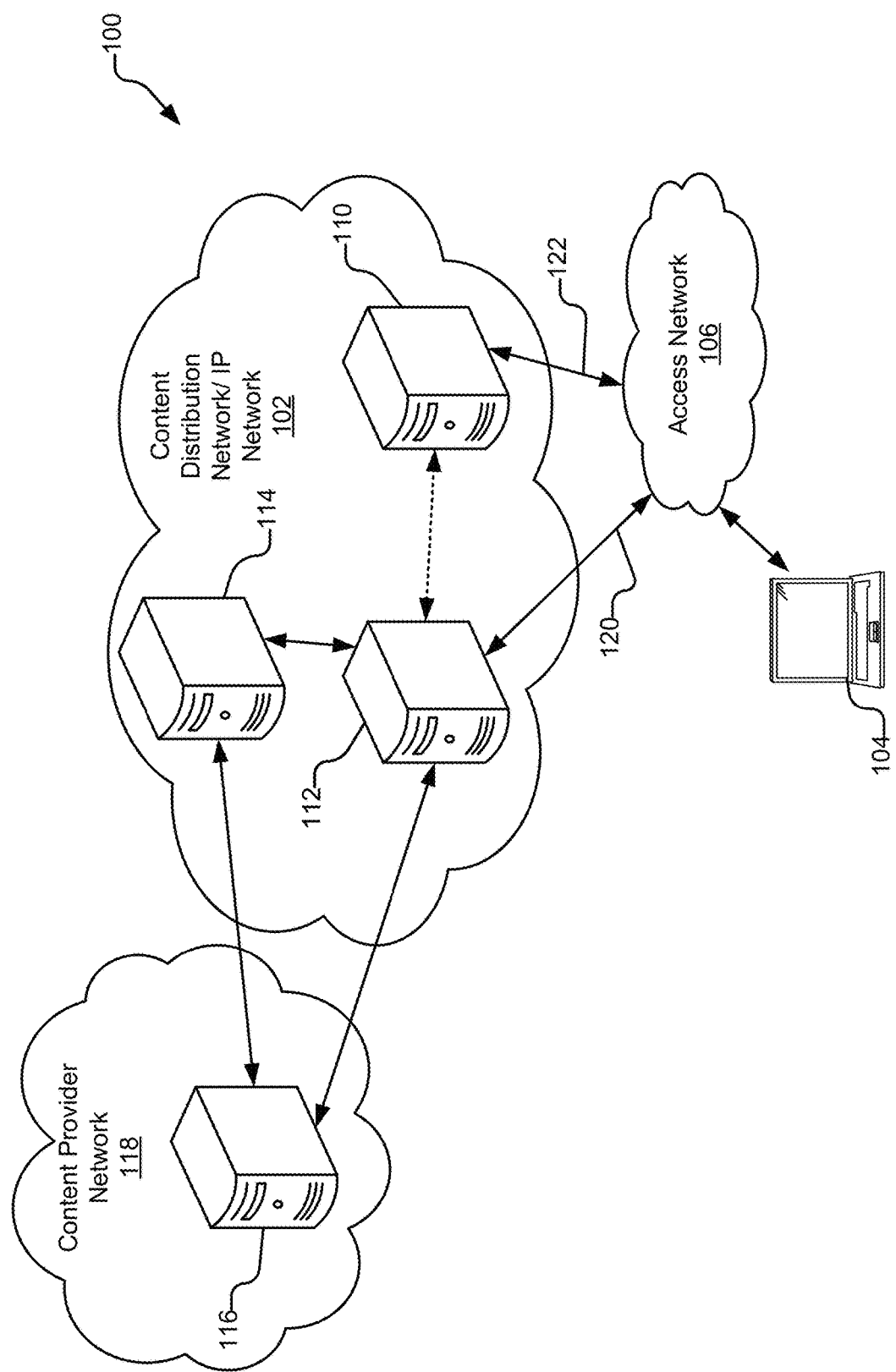
FIG. 1 is an example network environment for distributing content over a telecommunications network.

Aspects of the present disclosure involve systems and methods for selecting an edge server, rack, cluster or other device, which may be in a content delivery network (CDN)

to serve content to a client. For example, in one implementation an advancement of conventional anycast routing for the purpose of optimizing content delivery from a content delivery network is discussed. In anycast routing, many different devices on the Internet or other network may have the same Internet Protocol (IP) address (e.g., 1.2.3.4). The IP address provides a location on the network by which a user (e.g., user's browser) may access the machine(s) associated with the address to obtain content. Through the operation of routing protocols, such as the Border Gateway Protocol (BGP)), a user content request is routed to a device with the anycast IP address for the content. Often, a content device logically closest (least number of hops) to the requesting device is selected by the requesting device from which to receive the content. In this manner, the content is provided to the requesting device through the anycast IP address without having to first determine the location or other information of the requesting device.

However, networks interconnected at gateways typically do not know the topology of the connected network. So, a first network that traverses to a second network at one or more gateways does not know the topology of the connected network. Stated differently, BGP announcements and costs (distance, number of hops, etc.) are not shared between the networks. So, in the example of a CDN, the user's network may know where gateways to the CDN are located but will not know the topology of the CDN and vice versa. This may present problems to anycast routing because while the user may be routed to the nearest gateway, the nearest gateway may not be proximate the nearest content server of the CDN. So, it may be advantageous, in some circumstance, for the CDN to route the request to a gateway that is geographically further away from the requesting device because that gateway is logically closer to an appropriate content server in the CDN. In general, the CDN may utilize any criteria for determining when a content server is better suited to provide the content to the requested server.

In one implementation, the CDN may utilize a Direct Server Return (DSR) request command to create a tunnel from one content server to another content server of the CDN. Through the DSR tunnel, a request for content may be served from a content server that is more advantageous for the CDN for any number of reasons, such as from a content server that is logically closer to the content server. In determining when a DSR tunnel is created to provide the content, the CDN may access a database storing various information concerning the CDN, such as the location of egress gateways of the CDN in relation to one or more content servers, connecting network location information, the capabilities of one or more content servers, and/or load information of available content servers. In this manner, the CDN may control which content server provides the content to the requesting device in an anycast routing circumstance.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

FIG. 1 is an example network environment 100 for distributing content to one or more users that may be aided by identifying a geographic location of a requesting device. Although illustrated in FIG. 1 as a content delivery network, it should be appreciated that aspects of the present disclosure may apply to any type of telecommunications network that utilizes IP addresses for connecting an end user to one or more components of the network. For example, aspects of the disclosure may be utilized to connect a user of the network to an endpoint in the network, a conferencing server, a virtual private network device, and the like. Thus, although the CDN architecture is used throughout the document as the example network architecture through which aspects of the present disclosure may be applied; other network architectures and configurations are similarly contemplated.

In one implementation of the network environment 100, a CDN 102 is communicably coupled to one or more access networks 106. In general, the CDN 102 comprises one or more components configured to provide content to a user upon a request and an underlying IP network through which the request is received and the content is provided. The underlying IP network associated with the CDN servers may be of the form of any type IP-based communication network configured to transmit and receive communications through the network and may include any number and types of telecommunications components. In this manner, CDN-based components may be added to an existing IP-based communication network such that the components receive a request for content, retrieve the content from a storage device, and provide the content to the requesting device through the supporting IP network. For simplicity, the use of the term "CDN" throughout this disclosure refers to the combination of the one or more content servers and the underlying IP network for processing and transmitting communications, unless otherwise noted.

In one embodiment, a user device 104 connects to the CDN 102 through one or more access networks 106 to request and receive content or content files from the CDN. The access network 106 may be under the control of or operated/maintained by one or more entities, such as, for example, one or more Internet Service Providers (ISPs) that provide access to the CDN 102. Thus, for example, the access network 106 may provide Internet access to a user device 104. In addition, the access network 106 may include several connections to the IP network of the CDN 102. For example, access network 106 includes access point 120 and access point 122. Such access points may utilize a gateway networking device for entry and exit from the CDN 102. Thus, each entry point 120, 122 may include an egress gateway or an ingress gateway. Also, the user device 104 may be connected to any number of access networks 106 such that access to the CDN 102 may occur through another access network. In general, access to a CDN 102 (or underlying IP network associated with the CDN) may occur through any number of ingress gateways to the CDN through any number of access networks.

The CDN 102 is capable of providing content to a user device 104, which is generally any form of computing device, such as a personal computer, mobile device, tablet (e.g., iPad), or the like. Content may include, without limitation, videos, multimedia, images, audio files, text, documents, software, and other electronic resources. The user device 104 is configured to request, receive, process, and present content. In one implementation, the user device 104 includes an Internet browser application with which a link (e.g., a hyperlink) to a content item may be selected or otherwise entered, causing a request to be sent to a directory server 110 in the CDN 102.

The directory server 110 responds to the request by providing a network address (e.g., an IP address) where the content associated with the selected link can be obtained. In one implementation, the directory server 110 provides a domain name system (DNS) service, which resolves an alphanumeric domain name to an IP address. The directory server 110 resolves the link name (e.g., URL or other identifier) to an associated network address from which the user device 104 can retrieve the content. The operation of the directory server 110 and access network 106 to resolve requests for content from the user device 104 is discussed in more detail below with reference to FIG. 2.

In one implementation, the CDN 102 includes an edge server 112, which may cache content from another server to make it available in a more geographically or logically proximate location to the user device 104. The edge server 112 may reduce network loads, optimize utilization of available capacity, lower delivery costs, and/or reduce content download time. The edge server 112 is configured to provide requested content to a requestor, which may be the user device 104 possibly via an intermediate device, for example, in the access network 106. In one implementation, the edge server 112 provides the requested content that is locally stored in cache. In another implementation, the edge server 112 retrieves the requested content from another source, such as a media access server (MAS) (e.g., a content distribution server 114 or a content origin server 116 of a content provider network 118). The content is then served to the user device 104 in response to the requests.

There are at least two, and perhaps more, approaches to determining which CDN edge server 112 to direct a user to obtain content from the CDN 102. In general, a first approach includes a hypertext markup language page (HTML) page delivered to a requesting device 104 with embedded links that direct the requesting device to obtain the content from a server 112 in a location geographically near the device. The geographical analysis is often based on the location of the device's resolver as the CDN 102 may not know the actual location of the requesting device 104. The HTML page is dynamically generated with a link to a CDN content server 112 geo-proximate the user. In a second approach, each requesting device 104 obtains an HTML page with the same link that redirects or otherwise includes a reference to the CDN 102. Through a recursive DNS resolution process, or other DNS process, and using the location of the user's resolver, the DNS system returns an IP address of an edge server 112 to the requesting device 104. In many instances, neither approach is perfect in providing the best edge server to the device 104 as the location of the device relative to the resolver may not be known precisely, if at all. When the user is pointed to an edge server 112 that is not near the requesting device 104, the device will obtain the content but it will take longer and be more expensive, among other issues.

Figure 2:
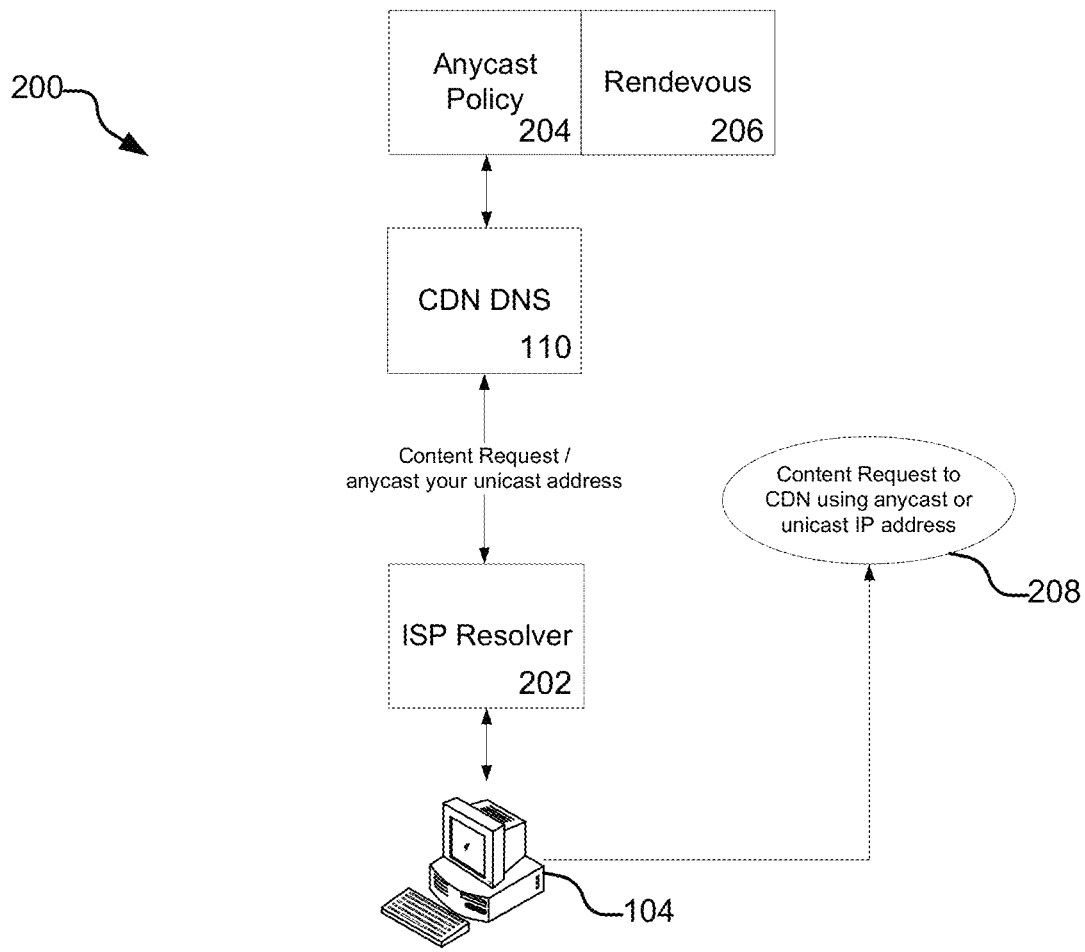
FIG. 2 is a network diagram illustrating a policy based methodology as to whether to return a unicast or anycast address to a node in a content delivery network able to service a content request.

As such, aspects of the present disclosure involve selective or optimized use of anycast routing. FIG. 2 is a network diagram illustrating a policy based methodology as to whether to return a unicast or anycast address to a node in a content delivery network able to service a content request. In one aspect, the system 200 includes one or more of the components of the CDN 102 discussed above. Thus, the system 200 includes a CDN DNS resolver 110 and a requesting device 104, referred to herein as the "user". As described, the user device 104 transmits a request for content to ISP resolver 202 which is, in turn, provided to the CDN DNS 110. In one example, the DNS 110 receives the request to resolve a location to serve a request and determines whether to provide an anycast IP address 204 or to use conventional rendezvous (edge server selection) techniques 206 to provide a unicast address to a specific edge location (e.g., cluster, rack or device able to serve, or efficiently retrieve and serve, the content). It should be noted that rendezvous techniques 206 may also deliver a virtual IP (VIP) address, or an address to a device suitable to obtain the content.

In one implementation, the domain name system (DNS) 110 of the CDN 102 may apply a policy that may access information or otherwise be provided with information as to the geographical association between users 104 and ISP resolvers 202 to determine whether an anycast 204 or unicast 206 is returned. In many instances, a user 104 obtains access to a network, such as the Internet, through an Internet Service Provider (ISP) that operates one or more resolvers. For example, the access network 106 of the network 100 of FIG. 1 may be an ISP that provides access to the CDN 102 to the user device 104. An ISP resolver 202 is tasked with interacting with the CDN 102 (and more particularly, the CDN DNS 110) to resolve requests from the user's browser, or other user network accessing device, to obtain a network address for the requested content. Hence, DNS 110 may be contacted by an ISP resolver 202 to obtain a location for the content requested by the user's device 104. Further, in one implementation, the CDN DNS 110 may determine or otherwise know the geographical location of the ISP resolver 202 because the request will include the IP address of the resolver. With the IP address of the resolver 202 received, the DNS 110 may access a database or other information source that provides geographic location information for resolvers based on the IP address. However, the DNS 110 may not know the geographical location of the user device 104 behind the resolver from the IP address of the ISP resolver 202. In such instances, the DNS 110 applies a policy to determine whether to return a unicast address 206 or an anycast address 204 to the requesting device 104 to provide the requested content.

In general, CDN DNS 110 or whatever DNS component is contacted to resolve a request for content may apply a policy to determine which type of address to return to the requesting device based on any cost function or consideration of the CDN 102. For example, when the cost pertains to a geographic proximity of an edge content server to a specific user requesting content, the policy may be based on knowledge of the proximity of an ISP's customers (such as user 104) to its resolvers 202. So, for example, if it is known that an ISP has many resolvers distributed across its geographic customer base and customers are generally near any given resolver to which that customer is assigned, the CDN may use a conventional rendezvous techniques 206 based on the location of the resolver to return a unicast address. In other words, the DNS 110 may assume that the determined geographic location of the ISP resolver 202 providing the request is geographically near the user device 104. With this information, the DNS 110 may provide a unicast address for the content to the user device 104 that is geographically near the determined location of the ISP resolver 202. With the unicast address, the user device 104 may access the content from a content server 208.

In contrast, for example, the DNS 110 may determine that the location of a particular ISP resolver 202 is not necessarily geographically proximate to the customers or users of the ISP. In this circumstance, the DNS 110 may return an anycast address to the requesting device 104. With the anycast address, the user device 104 may obtain the content 208 from the CDN 102 by accessing one of the content servers of the CDN accessible through the anycast address. In this manner, anycast routing of the CDN 102 may be applied selectively based on a policy and, in particular, whether the CDN 102 can determine the estimated geographic location of the requesting device 104.

Figure 3:
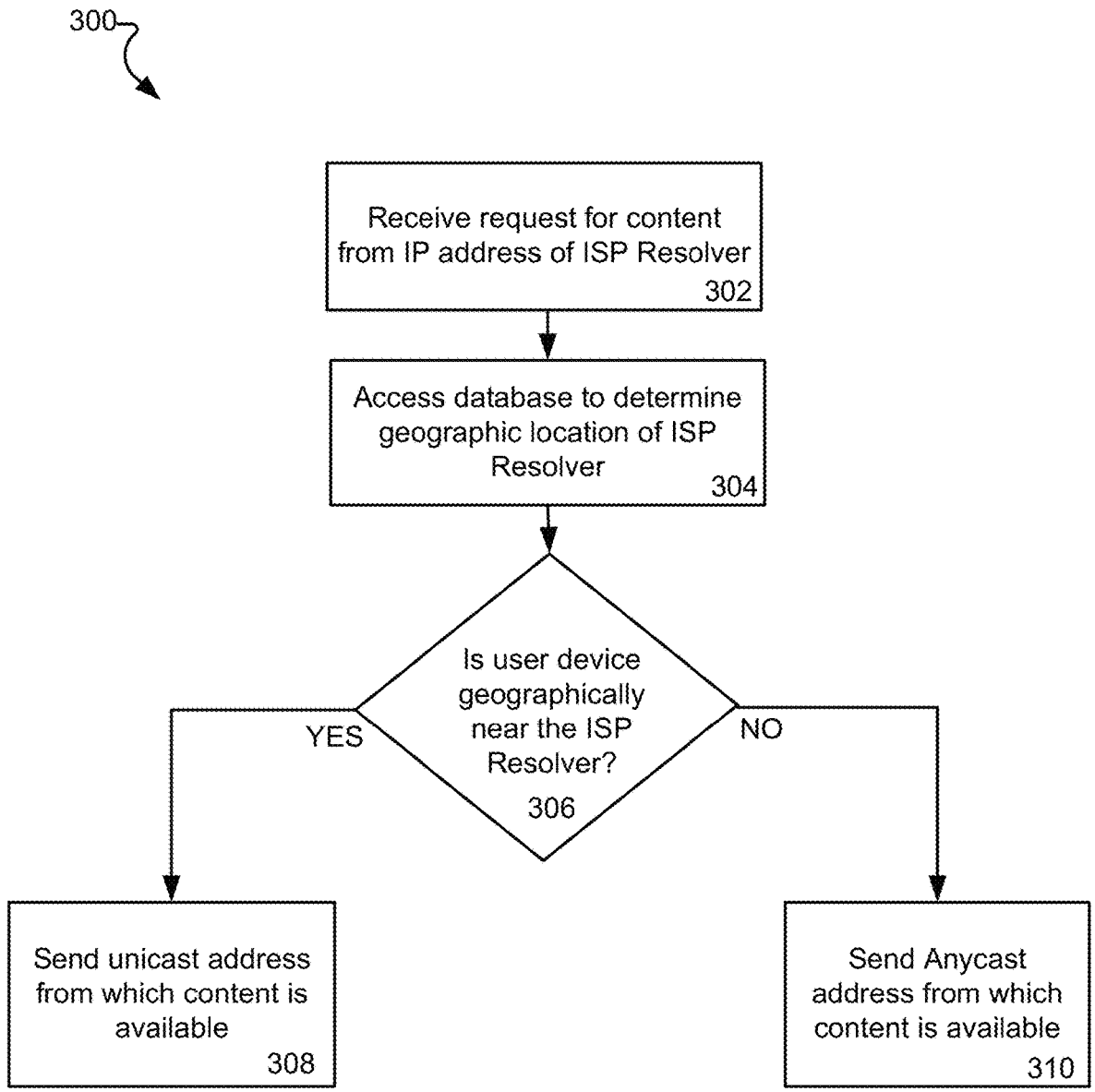
FIG. 3 is a flowchart of a method for the CDN DNS 110 to provide an anycast address or a unicast address to a requesting device based on knowledge of an ISP network.

FIG. 3 is a flowchart of a method for the CDN DNS 110 to provide an anycast address or a unicast address to a requesting device based on knowledge of an ISP network. In particular, the CDN DNS 110 may perform the operations of the method 300 through one or more hardware components, one or more software instructions, or a combination of hardware and software. Beginning in operation 302, the DNS 110 receives a request for content available from the CDN 102 from an ISP resolver 202. In one particular implementation, the request from the resolver 202 includes an IP address that is associated with the resolver. In operation 304, the DNS 110 may access a database that includes geographic location information for IP addresses. In particular, the DNS 110 compares the IP address of the ISP resolver 202 to one or more entries in the database to determine a geographic location of the ISP resolver.

With the geographic location of the ISP resolver 202 known, the DNS 110 may determine if the ISP is structured or connected such that the clients or customers of the ISP are connected to resolvers geographically proximate to the customer's location. As explained above, it is sometimes known by the DNS 110 that an ISP has many resolvers distributed across its geographic customer base and customers are generally near any given resolver to which that customer is assigned. Such information may be stored in the database accessed by the DNS 110. If the DNS 110 determines that the customer 104 is near the ISP resolver 110, the DNS 110 may determine and return a unicast address of a content server from which the content is available to the requesting device in operation 308. In contrast, if the DNS 110 determines that the customer 104 may not be near the ISP resolver 110, the DNS 110 may determine and return an anycast address of a content server from which the content is available to the requesting device in operation 310. In this manner, a policy to determine when an anycast address or a unicast address is provided to the requesting customer device 104 is applied based at least on location information known about a requesting ISP.

Additional aspects of the present disclosure involve selectively issuing a direct server return (DSR) or otherwise automatically forwarding a content request from an originally identified location (e.g. a first content server selected by anycast or rendezvous) to another location (a second content server at another location in the network) accounting for factors not considered, or not easily or optimally assessable, in conventional anycast or rendezvousing techniques. In one example, anycast routing or conventional rendezvous techniques may select a node of the CDN that is not a least cost node although performance may be good at the least cost node, with the selection of another node based on some other information known about the CDN.

Figure 4:
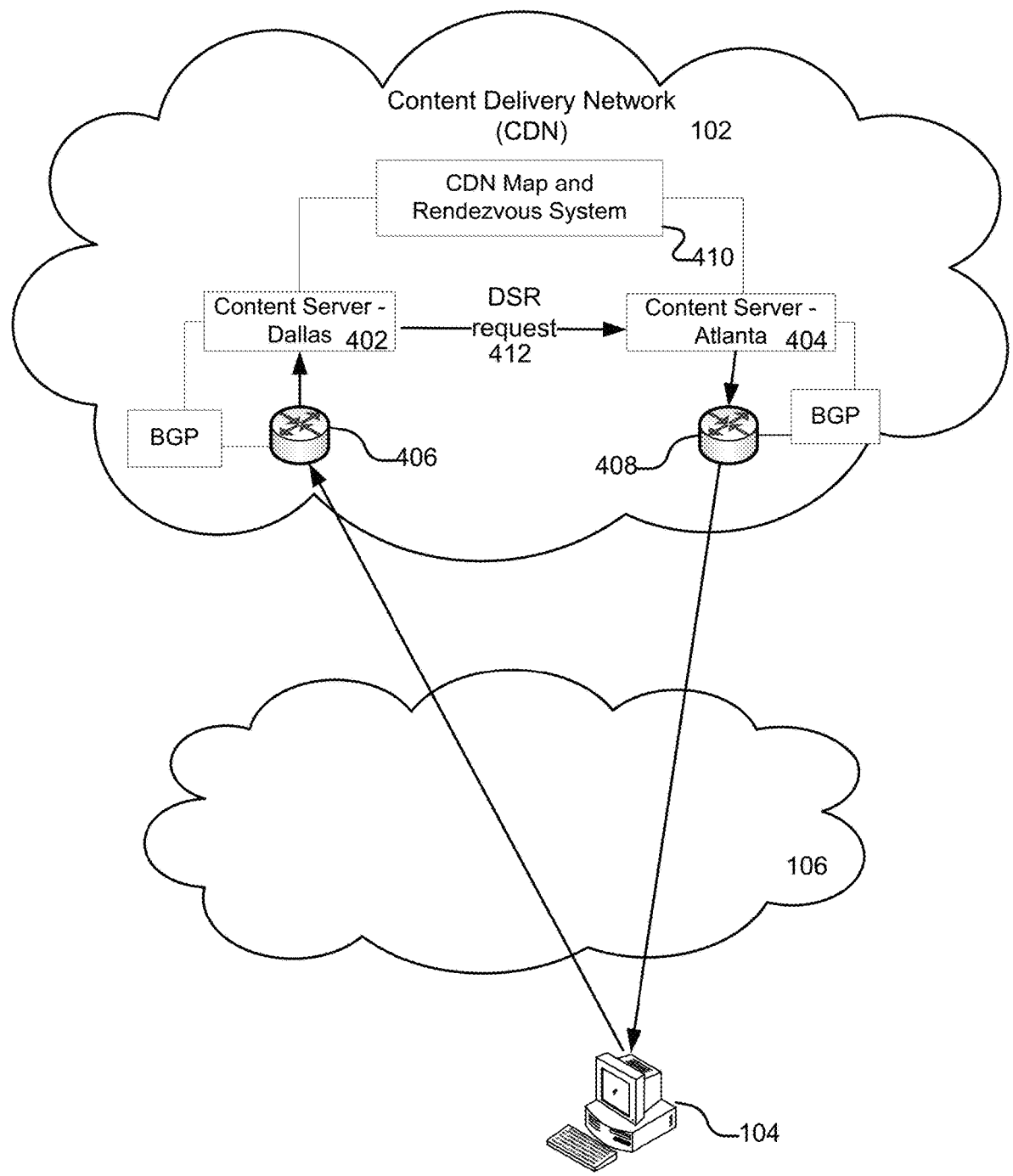
FIG. 4 is a network diagram illustrating a process of effecting a direct server return or other mechanism by which a content request arriving at a first node in a content delivery network is directed for servicing to a second node in the network.

FIG. 4 is a diagram illustrating an end user device 104 issuing a content request to a CDN network 102 with a content server in Dallas 402 and a content server in Atlanta 404. The diagram 400 illustrates the content servers being involved in the process of determining whether to have a different server service the request from the client device 104 than the service initially receiving the content request. It should be appreciated that the diagram 400 is highly simplified to illustrate the process of creating a DSR request to provide content from a selected content server. However, as described above with reference to FIG. 1, a CDN 102 may include hundreds and thousands of such servers, often with edge servers deployed throughout metropolitan regions, and includes numerous possible methodologies and tiers of such servers containing content. In some implementations, content may be stored in edge caches based on popularity of the content.

In the example shown in FIG. 4, resolution of the IP address is performed with a resolver and DNS system 110, and an edge server address is returned. The address may be a discrete address for a machine, a virtual address that may be serviced by one or many machines, or an anycast address associated with many machines, among other possibilities. In the example shown, the end user device 104 first provides a request for the content to the server in Dallas 402. More specifically, the browser on the end user device 104 sends a content request to the access network 106 connected to the user device. The access network 106, or more specifically an ISP resolver of the access network, requests an IP address of content server from the CDN 102. In response, the CDN 102 may provide an IP address for an edge server from which the content is available, such as the content server in Dallas 402. Communication between the access network 106 and the Dallas content server 402 may occur over network gateway 406.

In some implementations, the CDN 102 may determine that the content is to be served from a different content server that initially receives the request. Using the example of FIG. 4, based on network topology information (e.g., location of a gateway 408 interconnecting the CDN 102 and an access network 106 that the content traverses on its way to the end user device 104), the request for content may be routed to an Atlanta content server 404 before exiting the CDN 102 on its way to the end user 104. For example, the Dallas server 402 may be most logically proximate the user device 104 but, due to some CDN network topology considerations, the content is to be routed through an Atlanta gateway 408 to egress the CDN 102. In this manner, the CDN 102 may determine and serve the content from the Atlanta content server 404 as the Atlanta gateway 408 is a better choice to serve the content. In general, any network topology information may be considered when selecting an egress gateway 408 to provide the requested content, such as an enhanced performance, a lower cost, a lower number of hops, etc.

To determine an alternate content server from which to provide the content to the requesting device 104, the CDN 102 (such as the Dallas server 402) may perform a routing table look-up, e.g., a BGP routing look-up, and assess the route the packet traverses through the CDN 102 before egressing the CDN to the end user device 104. The BGP data for the CDN 102 may include information identifying the gateway (ingress and egress) points between the CDN and other networks. In some implementations, the CDN 102 may also access a database 410 storing a CDN map or other network topology information describing the location of content servers (e.g., edge servers), which may also describe the relationship of such servers relative to routers and gateways with other networks and access networks. Finally, the database 410 may include other information, such as rendezvous system information, to determine whether servers 404 proximate the egress gateway 408 (or egress router) have the appropriate content, have the appropriate bandwidth or capacity to handle the request, and otherwise are capable of appropriately fulfilling the content request should the first server 402 not be optimally suited to serve the request. It is possible some of the information stored in the database 410 and useful in making a direct server return decision 412 may be combined in a combined logic and aggregate database. In one implementation, if the initial route is not optimal for any number of possible reasons (cost, latency, network topology, number of hops, etc.) as determined by the CDN 102 based on the information stored in the database 410, the CDN may not serve the content from the original content server 402 and may, instead, forward the content request to a different node 404 within the CDN 102 to serve the request to the client device 104.

Referring to the network 400 illustrated in FIG. 4, the Dallas server 402 may receive the request for content from the access network 106. However, the CDN 102 may determine that it is more effective for the CDN 102 to serve the content from the Atlanta-based content server 404. This decision may be based on any network configuration known or determined through accessing the CDN map and rendezvous system database 410. Such a decision may be utilized for anycast routing or conventional rendezvous techniques of the CDN 102 to select a node of the CDN. The decision to serve the content from another source may be made to reduce cost, latency, the number of hops between devices and/or networks, or any other criteria of the network topology.

When it is determined that serving the content from an Atlanta server 404 is a better choice than serving the content from a Dallas server 402 (a first selected edge server), the Dallas server or some device associated with the Dallas server (e.g., a proxy) may create a tunnel with the Atlanta server. In one embodiment, the tunnel is created through a direct server return 412 request from the Dallas server 402 to the Atlanta server 404 so that the Atlanta server will fill the request from the end user device 104. The DSR request 412 is in contrast to the Dallas server 402 redirecting the end user device 104 to request the content from the Atlanta node 404. Rather, the Dallas server 402 causes the Atlanta server 404 to serve the request to the end user device 104 directly in response to the DSR request 412 from the Dallas server. However, it should be appreciated that any known or hereafter developed method for causing the Atlanta server 404 to serve the content to the end user device 104 as directed by the Dallas server 402 may be utilized.

Figure 5:
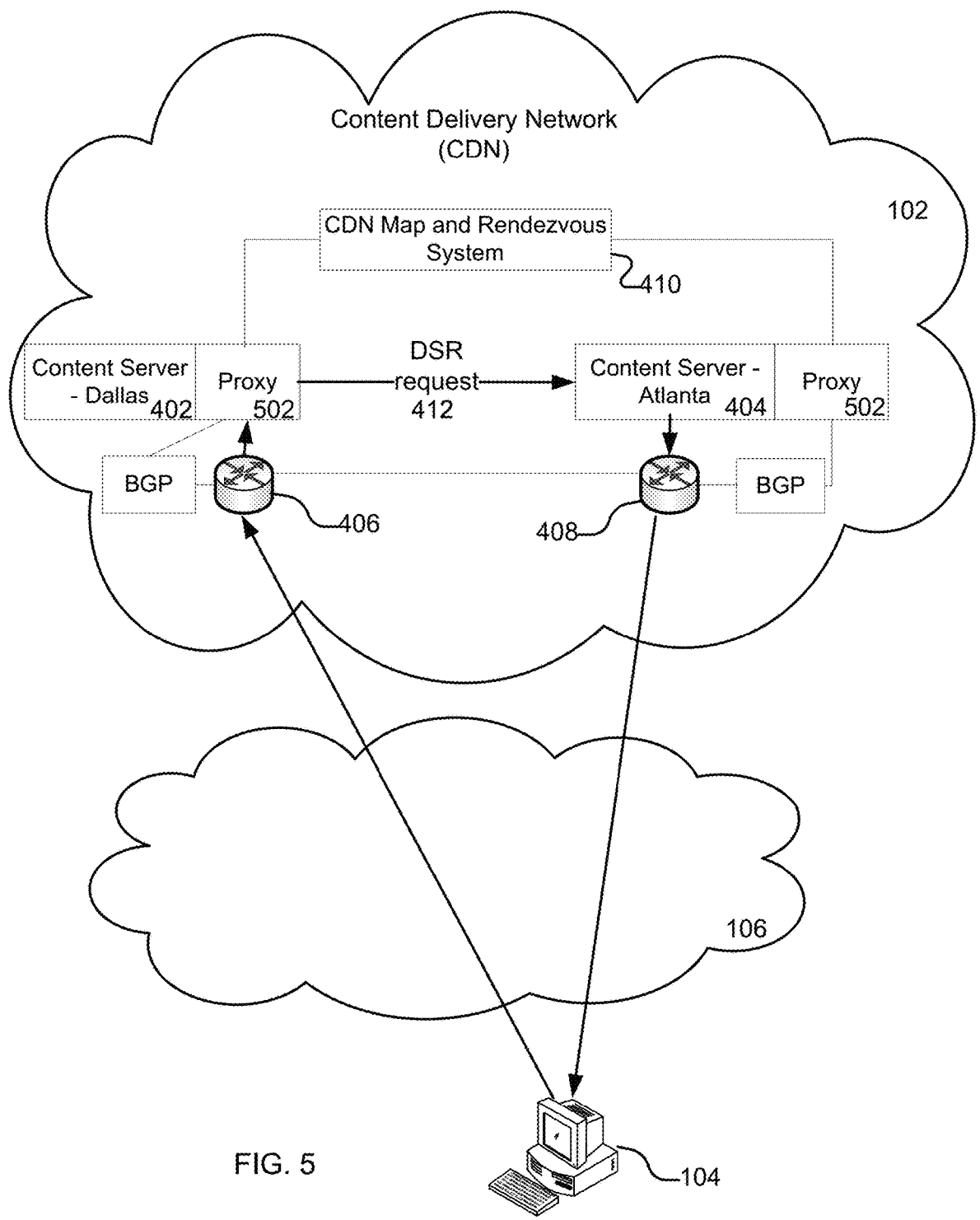
FIG. 5 is a network diagram illustrating the network of FIG. 4 utilizing one or more proxy devices as part of the network topology.

FIG. 5 is a network diagram illustrating the network of FIG. 4 utilizing one or more proxy devices as part of the network topology. In general, the network 500 is the same network as described above in relation to FIG. 4. However, as shown, the network 500 of FIG. 5 may include one or more proxy servers 502. In particular, the CDN 102 may include a proxy server 502 associated with any content server (or more likely group of content servers) to make such decisions. However, the operations and methodologies discussed above with relation to the networks of FIGS. 1-4 may also be applied to the network 500 of FIG. 5 through the one or more proxy servers 502 associated with content servers of the CDN 102.

Further, using a proxy server 502, or practically speaking many proxies across different metropolitan areas of a CDN 102, the network 500 may perform the DSR request tunneling 412 discussed above. Referring specifically to the network 500 of FIG. 5 in relation to the scenario discussed above, an initial anycast request is received at an Atlanta-based content server 404 through the DSR tunnel 412 from the Dallas content server 402. However, in this example, the request is first received at a proxy server 502 associated with the content server 402 and the request for the DSR 412 is received at the proxy server associated with the Atlanta-based content server 404. As such, the proxy server 502 is dedicated or otherwise optimized to make tunneling DSR decisions 412 as to which location from which to serve the request.

As discussed above, the system has access to a CDN map as well as BGP data, perhaps stored in a database 410. With this information, the system may know where the content will be routed in order to egress the CDN 102 on its way to the user device 104. The system also knows what content servers are proximate various routers and gateways, and what content is present at such locations. In addition to the discussion above, the system may also know load information at one or more content servers of the CDN 102. For example, besides knowing content server location for a given metro, the system may also know the load on those content servers. Hence, the system may also account for load when making a DSR tunneling request 412 determination—e.g., whether to serve the content from a different location compared to where the request was originally received based on the anycast IP address. In such an example, network topology may suggest that a request can be served from a different location with the same or substantially similar performance but at a lower cost based on a longer backbone haul from the first location (e.g., Dallas) compared to a shorter haul based on the second location (e.g., Atlanta).

The system may also account for load in Atlanta. Thus, if the servers available to serve the request content are at or near capacity or overloaded, forwarding the request from the Dallas proxy to the Atlanta content server 404 may not be the appropriate decision. Here, the system may choose a different content server (including Dallas) taking into account the cost as well as load. Hence, the next closest location to the network egress may be a server in the Nashville metropolitan network area, which has capacity to serve the request.

Besides picking a location to serve content based on network cost, capacity and/or performance particularly when originating from an anycast address, the system may also perform inter-metro load balancing across content servers in different metropolitan CDN areas or intra-metro load balancing across content servers within a metropolitan CDN area. In one implementation, a request is received at a proxy 502 associated with an initial anycast IP address in a location 402 that will provide optimal performance based on the ingress of the request. However, rather than simply serve the request from the server at the proxy 502 within the metro where it was first received, the system may also consider network costs and load to determine from where within the metro or from another metro to serve the content. Based on the initial anycast address of the request, the system understands that performance based on end-to-end latency will likely be optimal and hence servicing the request from the location of receipt will provide a good user experience based on performance. The system, however, can further optimize servicing the request based on CDN architecture, costs and load, by further analyzing from where within the CDN to service the request without impacting performance or minimally impacting performance while optimizing other attributes of the request.

The term "content" as used herein means any kind of data, in any form, regardless of its representation and regardless of what it represents. The term "content" may include, without limitation, static and/or dynamic images, text, audio content, including streamed audio, video content, including streamed video, web pages, computer programs, documents, files, and the like. Some content may be embedded in other content, e.g., using markup languages such as HTML and XML. Content includes content which is created or formed or composed specifically in response to a particular request. The term "resource" or "object" is sometimes used herein to refer to content.

FIGS. 1-5 illustrate an example network configuration for practicing aspects of the present disclosure. The illustrated networks would include many other components involved in servicing a request and providing content; however, the diagram here focuses on only some components involved in the system and one of ordinary skill will readily understand other conventional components within the network. With respect to content delivery, in these examples a request originates from a computing device operating a browser. The computing device may be some form of conventional device such as personal computer, a thin client, a tablet, a smart phone, a set-top box, a cable box, or the like, what is capable of running a browser and providing a user with the ability to request content over a network connection, or some other application suitable for interacting with a network and requesting content therefrom. The user device may be a consumer device deployed in a public network, may be an enterprise device deployed in private network or other type of device. The network connection, in many instances, will be provided by an Internet service provider (ISP) operating one or more resolvers. A resolver (also referred to as a DNS resolver) is a client-side device used to resolve a network address (e.g., translate a domain name into an IP address) for a requested resource. Generally speaking, the resolver contacts (e.g., queries) a DNS infrastructure, which may involve many different components, to resolve a network address for a resource.

To illustrate aspects of the disclosure, consider when a user enters into the browser web page address http://www.example.com. The browser contacts the resolver, which in turn requests the IP address for the example.com Web page from DNS. DNS may return a vacant, VIP or anycast address of a server capable of delivering a hypertext markup language (HTML) document that will render the Web page in the browser. The present flow discusses contacting a content server of a CDN for the Web page; however, this is done for explanation purposes, and it is possible that DNS may resolve the request to some other device for obtaining the Web page. In order to obtain the HTML document, the client device establishes a TCP connection, which may encapsulate an HTTP protocol communication, with the server.

As discussed herein, aspects of the present disclosure may involve:

Use of overrides (e.g., DNS requests come from a known DNS resolver, localize to a non-anycast IP at DNS resolution time)

Use of overrides on client IP received by an anycast HTTP server which cause the anycast server to send the packet to a more appropriate server to respond Use of anycast to receive the packet, then tunneling with BGP lookups to send the HTTP request to the right egress, where it is answered Only using anycast in certain regions (i.e., selectively send requests from certain ISP's to anycast addresses so that the CDN can deal with serving content to users from nodes in the same geographical area as the user (e.g, Portland users from Portland, Seattle from Seattle, and San Jose from San Jose, even though these all use the same DNS infrastructure)).

Figure 6:
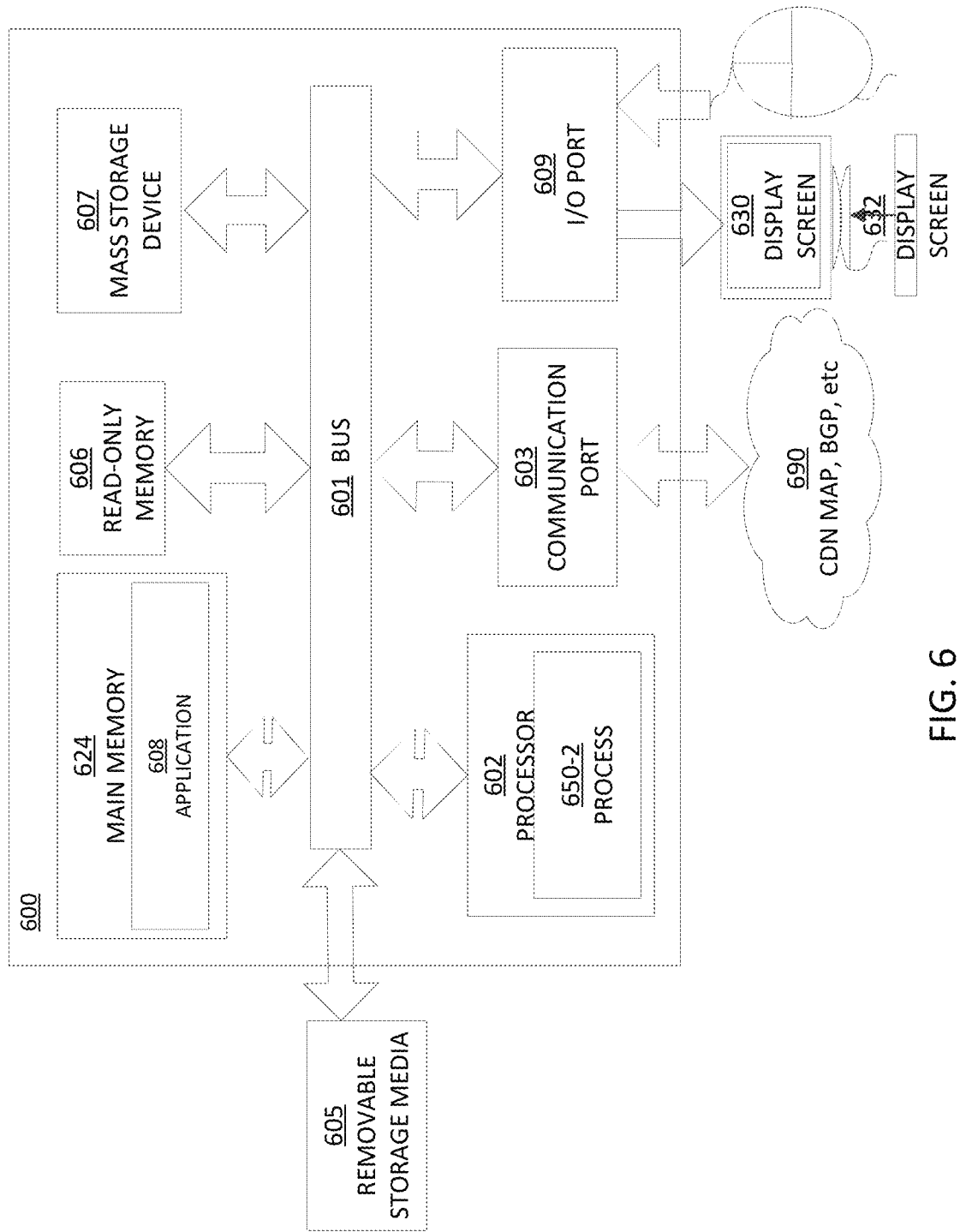
FIG. 6 is an example of a computing system that may implement various systems, network elements, and methods discussed herein.

FIG. 6 is an example schematic diagram of a computing system 600 that may implement various methodologies discussed herein. The computing system for the application 608 includes a bus 601 (i.e., interconnect), at least one processor 602 or other compute element, at least one communication port 603, a main memory 604, a removable storage media 605, a read-only memory 606, and a mass storage device 607. Processor(s) 602 can be any known processor, such as, but not limited to, an Intel® Itanium® or Itanium 2® processor(s), AMD® Opteron® or Athlon MP® processor(s), or Motorola® lines of processors. Communication port 603 can be any of an RS-232 port for use with a modem based dial-up connection, a 10/100 Ethernet port, a Gigabit port using copper or fiber, or a USB port. Communication port(s) 603 may be chosen depending on a network such as a Local Area Network (LAN), a Wide Area Network (WAN), or any network to which the computer system 600 connects. The rendezvous application may be in communication with peripheral devices (e.g., display screen 630, input device 616 via Input/Output (I/O) port 609.

Main memory 604 can be Random Access Memory (RAM) or any other dynamic storage device(s) commonly known in the art. Read-only memory 606 can be any static storage device(s) such as Programmable Read-Only Memory (PROM) chips for storing static information such as instructions for processor 602. Mass storage device 607 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 601 communicatively couples processor(s) 602 with the other memory, storage and communications blocks. Bus 601 can be a PCI/PCI-X, SCSI, or Universal Serial Bus (USB) based system bus (or other) depending on the storage devices used. Removable storage media 605 can be any kind of external hard drives, thumb drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 604 is encoded with the CDN node compute engine (API) application 650-1 that supports functionality as discussed above and as discussed further below. For example, in one embodiment, the management application 650-1 may include or otherwise implement the various processes and/or instructions described herein. The management application 650-1 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 602 accesses main memory 604 via the use of bus 601 in order to launch, run, execute, interpret or otherwise perform the logic instructions of the 650-1.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages should be understood by the foregoing description, and it should be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

We claim:

1. A method of servicing a request for content comprising:
    receiving a request to resolve a content request to obtain a network address for content from a content delivery network;
    obtaining access network configuration information from a database, the access network configuration information comprising an estimated geographic location of an end user device in communication with the access network in relation to a geographic location of a resolver of the access network;
    returning an anycast address for the content request based at least on the estimated geographic location of the end user device in communication with the access network in relation to the resolver of the access network, the estimated geographic location of the end user device different than the geographic location of a resolver of the access network;
    receiving, at a first content server of the content delivery network, a content request based on the returned anycast IP address;
    determining an egress location from the content delivery network, wherein the egress location comprises a location of an egress gateway device in the content delivery network through which the content will be sent to the end user device via the access network;
    determining to serve the content in response to the the content request from a second content server of the content delivery network based at least on the egress location, wherein the second content server is different from the first content server; and
    causing the content to be served from the second content server.

2. The method of claim 1 further comprising: issuing a direct server return request from the first content server to the second content server to service the request for content.

3. The method of claim 2 wherein determining to serve the content from the second content server of the content delivery network is based at least on a load of the second server.

4. The method of claim 2 wherein the first content server comprises a first proxy server, the first proxy server obtaining information pertaining to a load of the second content server to determine to serve the content from the second content server.

5. The method of claim 2 wherein determining to serve the content from the second content server of the content delivery network is based at least on a load of the first content server.

6. The method of claim 2 wherein the second content server transmits the requested content to the end user device in response to the direct server return request.

7. The method of claim 6 wherein determining to serve the content from the second server of the content delivery network is based at least on a measured latency of providing the content from the second server.

8. The method of claim 1 wherein the estimated geographic location of the end user device is geographically dispersed from the location of the resolver of the access network.

9. A system for delivering requested content to a device, the system comprising:
    a domain name server (DNS) receiving a to resolve a content to obtain a network address for content from a content delivery network;
    a database storing access network configuration information comprising an estimated geographic location of an end user device in communication with the access network in relation to a geographic location of a resolver of the access network;
    a computing device in communication with the database, the computing device comprising:
        at least one processor;
        at least one communication port for communication with the database;

a tangible computer-readable medium with one or more executable instructions stored thereon, wherein the at least one processor executes the one or more instructions to perform the operations of:
  obtaining the access network configuration information from the database;
  instructing the DNS to return an anycast address for the content request based at least on the estimated geographic location of the end user device in communication with the access network in relation to the resolver of the access network, the estimated geographic location of the end user device different than the geographic location of a resolver of the access network;
  receiving, at a first content server of the content delivery network, a content based on the returned anycast IP address;
  determining an egress location from the content delivery network, wherein the egress location comprises a location of an egress gateway device in the content delivery network through which the content will be sent to the end user device via the access network;
  determining to serve the content in response to the content from a second content server of the content delivery network based at least on the egress location, wherein the second content server is different from the first content server; and
  causing the content to be served from the second content server.

10. The system of claim 9 wherein the at least one processor further performs the operations of:
  issuing a direct server return from the first content server to the second content server to service the for content.

11. The system of claim 10 wherein determining to serve the content from the second content server is based at least on a load of the second content server.

12. The system of claim 10 wherein the first content server comprises a proxy server, the first proxy server obtaining information pertaining to a load of the second content server to determine to serve the content from the second server.

13. The system of claim 10 wherein determining to serve the content from the second content server of the content delivery network is based at least on a load of the first content server.

14. The system of claim 10 wherein the second content server transmits the requested content to the end user device in response to the direct server return request.

15. The system of claim 14 wherein determining to serve the content from the second content server of the content delivery network is based at least on a measured latency of providing the content from the second content server.

16. The system of claim 9 wherein the estimated geographic location of the end user device is geographically dispersed from the location of the resolver of the access network.

17. The system of claim 9 wherein the first content server is located in a first metro area of the content delivery network and the second content server is located in a second metro area of the content delivery network.

* * * * *